United States Patent [19]

Milling

[11] Patent Number: 4,598,743
[45] Date of Patent: Jul. 8, 1986

[54] FILLING NOZZLE
[75] Inventor: Gunnar S. Milling, Falun, Sweden
[73] Assignee: Aktiebolaget Electrolux, Stockholm, Sweden
[21] Appl. No.: 773,859
[22] Filed: Sep. 9, 1985

Related U.S. Application Data

[63] Continuation of Ser. No. 444,739, Nov. 26, 1982, abandoned.

[30] Foreign Application Priority Data

Dec. 1, 1981 [SE] Sweden ................................ 8107170

[51] Int. Cl.⁴ .......................... B65C 3/00; B65B 39/04
[52] U.S. Cl. ..................................... 141/296; 141/198; 141/302
[58] Field of Search ..................... 141/94–96, 141/98, 192, 311–312, 318–321, 326, 325, 344–354, 357–360, 361, 392, 296, 307, 308, 392, 285, 290, 291, 198, 379, 381; 251/339; 222/501

[56] References Cited

U.S. PATENT DOCUMENTS

| | | | |
|---|---|---|---|
| 1,182,452 | 5/1916 | Bucklin | 141/296 |
| 1,672,983 | 6/1928 | Mapel | 141/308 X |
| 2,011,393 | 8/1935 | Bradely | 141/94 |
| 2,703,194 | 3/1955 | White | 141/311 |
| 2,808,178 | 10/1957 | Di Grado et al. | 141/296 X |
| 2,897,855 | 8/1959 | Vadas | 141/286 |
| 3,278,094 | 10/1966 | Perry | 141/291 X |
| 3,540,402 | 11/1970 | Kocher | 141/198 |
| 3,812,890 | 5/1974 | Haas et al. | 141/94 |
| 4,079,761 | 3/1978 | Herbst, Sr. | 141/198 |
| 4,202,386 | 5/1980 | Orr | 141/95 X |
| 4,308,569 | 12/1981 | Rheindorf | 141/95 X |

FOREIGN PATENT DOCUMENTS

| | | | |
|---|---|---|---|
| 839163 | 4/1952 | Fed. Rep. of Germany | 141/335 |
| 112230 | 10/1925 | Switzerland | 141/335 |
| 23462 | of 1894 | United Kingdom | 141/335 |
| 362314 | 3/1932 | United Kingdom | 141/335 |

Primary Examiner—Stephen Marcus
Assistant Examiner—Ernest G. Cusick
Attorney, Agent, or Firm—Alfred E. Miller

[57] ABSTRACT

In order to avoid overfilling of fuel to small internal combustion engines a nozzle is presented which automatically closes the flow when the tank is almost full. The nozzle is put on the fuel container which communicates with the surroundings by an air conduit through the nozzle, constituted of two sleeves, an outer one (13) and an inner one (14) and a bushing (11). The fuel passes the inner sleeve, whose outer end has a valve body (15). At rest the outer sleeve presses against the body and then the nozzle is closed. When the nozzle is put into a filling hole, the spring-biased outer sleeve is pushed back and allows the fuel to pass through the inner sleeve to the tank. When the fuel reaches the outer end of the nozzle the air inlet to the container is closed and the flow stops. When the nozzle is pulled out of the hole it is automatically reset into the rest position.

1 Claim, 3 Drawing Figures

FILLING NOZZLE

This application is a continuation, of application Ser. No. 444,739, filed Nov. 26, 1982 and now abandoned.

The present invention relates to a filling nozzle for fuel containers to be used in filling fuel into tanks of e.g. internal combustion engines.

In the field of filling arrangements of the type concerned it is known to provide an air inlet to the fuel container as a complement to the flow way. Simultaneously as air is let into the container, air is evacuated from the tank so that an even flow of fuel through the nozzle is obtained. It is known from prior patent specifications in this field (e.g. Germany No. 1,227,796) how to insert a one-way valve in the inlet of a tank through a nozzle which on filling occasions presses the valve into an open position. Arrangements of this kind have the common drawback that the user does not know when the tank is full which may cause an overfilling and waste of fuel. It is therefore desired to complete present arrangements with a control member which automatically closes the flow way, when the tank is almost full.

The present invention presents a nozzle which by means of a valve member and an air conduit solves the problem of conducting fuel from a container into a tank without the risk of overfilling. The fuel passes through two concentric sleeves of which one is controlled by a valve which is opened when the nozzle is pressed into the filling hole. The nozzle is suitably disposed on the container which is connected to the surroundings by an air pipe through the nozzle. When the fuel flows a gurgling sound is heard from the container, which ceases when the level in the tank reaches the outer end of the nozzle and the air inlet is closed and the flow stops. The user then pulls the nozzle out of the filling hole whereby the valve closes so that waste of fuel is prevented. Thus, two advantages of the invention should be apparent. First, the user receives information by the stopping of the sound indicating that the tank is almost full, and second, the risk of waste and overfilling is eliminated.

An embodiment of the invention will be described of an example with reference to the accompanying drawing in which.

Figure 1:
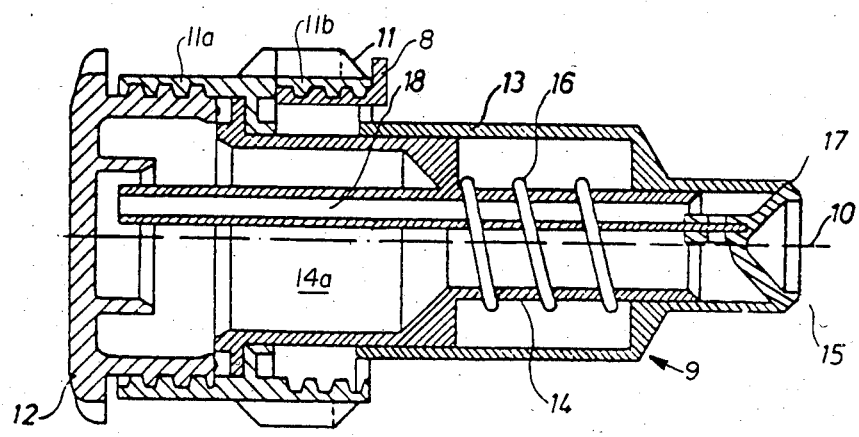
FIG. 1 is a cross section of a filling nozzle and FIG. 2 is the same cross section, in which the valve is in an open position.
Figure 2:
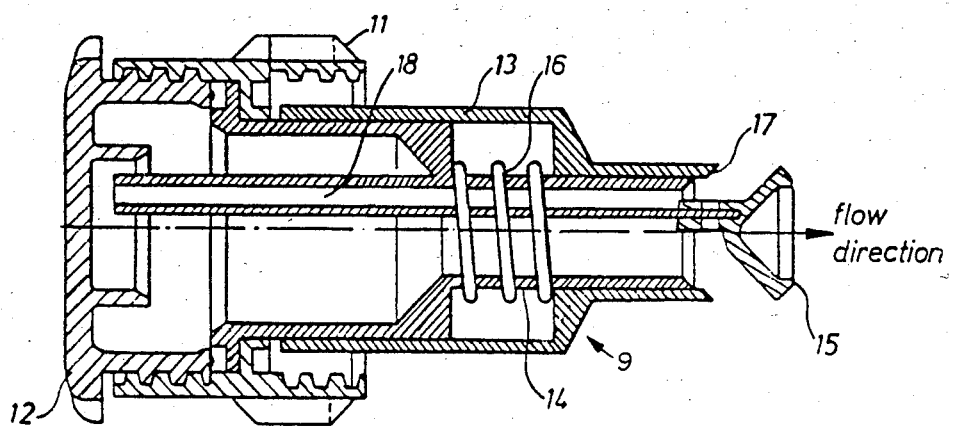
Figure 3:
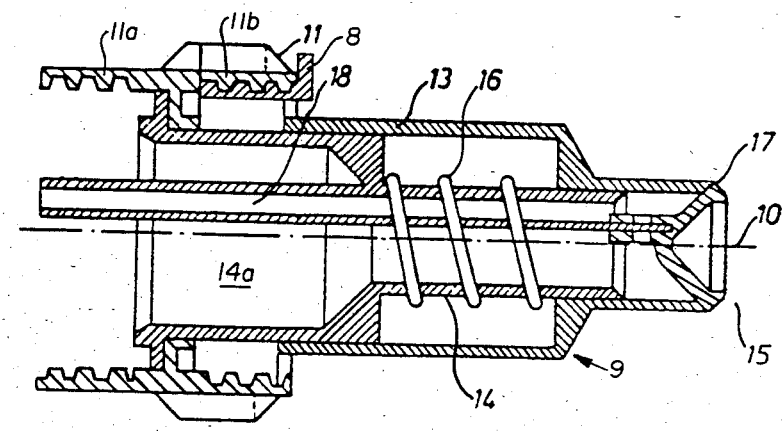
FIG. 3 is a cross section of the filling nozzle with the cap removed.

The shown embodiment is preferably made of plastic parts which are joined together, preferably by threads. Most of the parts are concentrically assembled along a central axis 10 and outermost is a screw bushing 11 to a threaded outlet of a fuel container (not shown) having a pair of female threads 11a. The threads 11a and 11b are provided to enable the nozzle 9 to be attached in one of two end positions, namely a stored position and a dispensing position, and to a threaded outlet of a fuel container 8. In the stored position, the screw threads 11b engage with the outlet of the container and a screw cap 12 is screwed into the outwardly directed thread 11a of the bushing to maintain the outlet in a closed position, as for example, during transportation of the fuel. In order to place the nozzle 9 in a dispensing position, it is removed from the container 8 and the fill cap 12 unscrewed. The nozzle 9 is reversed so that the thread 11a may be put on the outlet of the container 8. The nozzle is then ready to be used for filling of fuel from the container to a tank (not shown) provided with a filling hole where the end of the nozzle can be inserted.

the nozzle has two further bushings, an outer one 13 and an inner one 14. The latter having an internal bore 14a. The inner bushing 14 is rigidly connected to the bushing 11, and the outer bushing is mounted for limited sliding movement relative to the inner bushing 14. The fuel passes from the container through the bore 14a in the inner bushing, which, at its outer end, has a valve body 15. The valve body 15 is biased by a spring 16 into engagement with a valve seat 17 in the outer bushing 13, whereby the nozzle is maintained in a closed position to prevent flow of fuel. When the end of the nozzle is put into the filling hole and pressed thereto, the outer bushing is moved towards the screw bushing whereby the valve seat 17 moves away from the valve body 15 and the nozzle opens so that fuel passes from the container to the tank (FIG. 2). The interior of the container communicates with the surroundings and gets air through a pipe 18 along the inner bushing. When the fuel in the tank reaches up to the outer end of the pipe 18 the air intake to the container is closed. When still more fuel passes from the container an underpressure arises therein which makes the flow stop. The filling is then finished and the nozzle is pulled out of the hole, whereby the valve 15, 17 closes again. It is not necessary to unscrew the nozzle from the threaded outlet from the container between several fillings as the container is still kept closed by the valve 15, 17. In the case of the storing of fuel for an extended length of time, however, the container should be closed by the screw cap, for instance by removing the nozzle, and the turning and fastening of it, so that threads 11a point outwardly, and the cap 12 screwed on, as shown in FIG. 1.

I claim:

1. A fuel dispensing nozzle for a receiver having a fastening member for connecting said nozzle to an outlet of a fuel container, said fastening member having a sleeve to couple said nozzle to said outlet comprising: a fluid passageway extending through said nozzle, a valve member, biasing means to bias said valve member to a position in which flow through said passageway is prevented, and said valve member being openable against the action of said biasing means by pressing the nozzle into a filling hole, an air conduit in the form of a channel extending along the passageway through the nozzle to be opened and closed by the said valve member simultaneously with the passageway, said passageway being provided with an end opening in the container below the fuel surface in the receiver when at least a part of said nozzle and said passageway are submerged in the fuel in said receiver, said sleeve being threaded at both ends whereby either end may be screw-threaded on said outlet of the fuel container and a cap adapted to be removably attached to one end of said nozzle whereby said nozzle is adapted to be turned approximately 180 degrees relative to its longitudinal axis so that the opposite end thereof is connected to said fuel container to thereby function as a closure for said fuel container whereby fuel flows freely from said fuel container by gravity when one end of the nozzle is connected to said container and fuel flow from the container is prevented when said opposite end of the nozzle is connected to said fuel container.

* * * * *